B. W. BROWN.
MACHINE FOR CHOPPING CHICLE GUM.
APPLICATION FILED DEC. 3, 1915.
1,190,372.
Patented July 11, 1916.
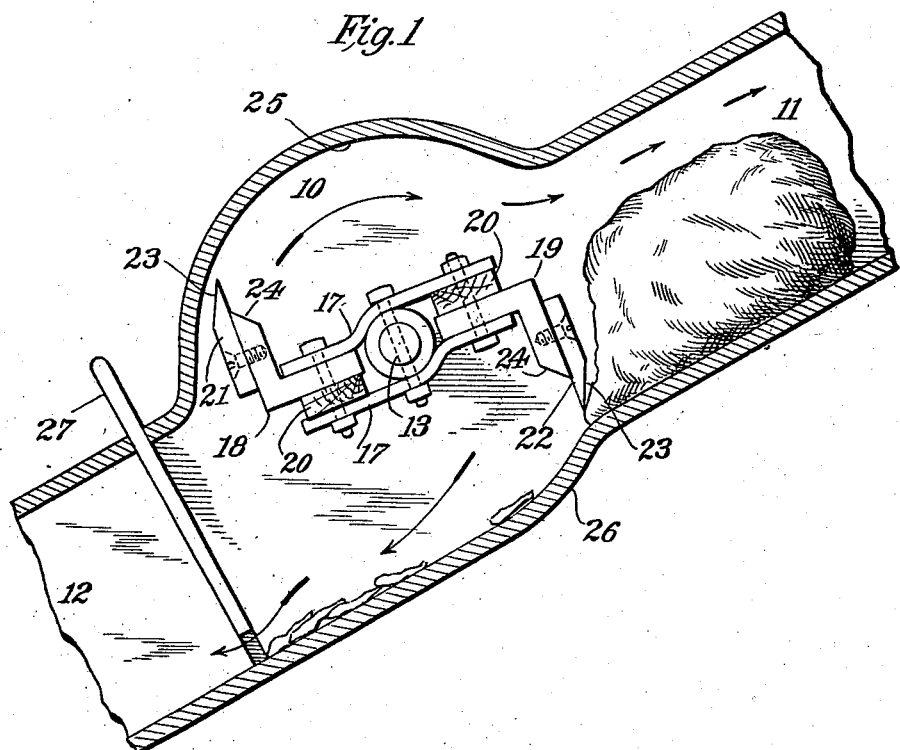
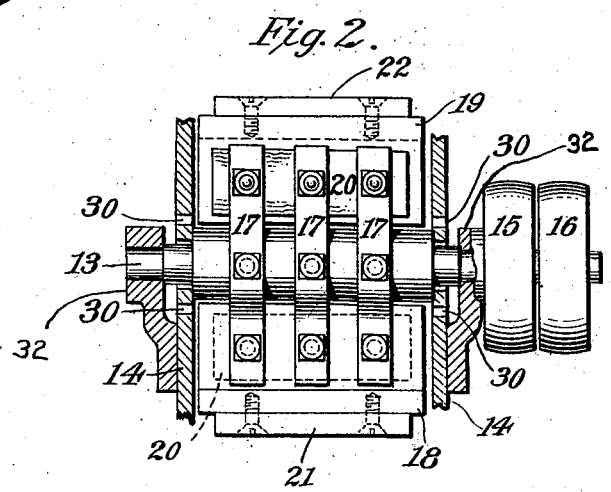
Inventor
Benjamin W. Brown,
By his Attorneys
Kerr Page Cooper + Hayward

UNITED STATES PATENT OFFICE.

BENJAMIN W. BROWN, OF ROSELLE PARK, NEW JERSEY.

MACHINE FOR CHOPPING CHICLE-GUM.

1,190,372.  Specification of Letters Patent.  Patented July 11, 1916.

Application filed December 3, 1915. Serial No. 64,939.

*To all whom it may concern:*

Be it known that I, BENJAMIN W. BROWN, a citizen of the United States, residing at Roselle Park, in the county of Union and State of New Jersey, have invented certain new and useful Improvements in Machines for Chopping Chicle-Gum, of which the following is a full, clear, and exact description.

This invention relates to improvements in machines for chopping chicle gum.

Chicle gum when in the raw state is in the form of bisques or billets. In preparing the gum it is first necessary to cut these billets into small pieces for washing and other treatment. This work has always been carried out by hand. Laborers were employed who used ordinary hatchets to break up the gum into pieces of the proper size. In previous attempts to cut the gum by machine it has been found that on account of the low melting point of the gum that after the machine ran for a time the gum would become a sticky mass and clog the machine.

In my improved machine the parts are so organized that the action of a hatchet is imitated. With this arrangement the gum does not melt and the chopping can be carried out in an expeditious manner.

In the drawings: Figure 1 is a side view of the machine. Fig. 2 is a top view of the chopper with the shaft and driving pulleys therefor.

In more detail the housing for the chopper includes a central portion 10 and two inclined chutes 11 and 12, which connect with the central portion. The arrangement is such that a billet of gum upon being placed in the upper inclined chute 11 will slide by gravity down to the chopper which is located in the central portion of the housing. The chips then pass out of the machine through the lower chute 12.

The shaft carrying the chopper is shown at 13, and is journaled in bearings 32 which are secured to and spaced slightly from the side walls 14 of the central portion of the housing. By spacing the bearings slightly from the housing oil from the bearings does not work into the interior of the housing and damage the chicle gum therein. On the extended end of the shaft are two pulleys 15 and 16, one being tight on the shaft and the other an idler pulley. The central portion of the shaft 13 has bolted to it a number of straps 17. Between these straps and adjacent to their ends are angle members 18 and 19.

Between the angle members and the one set of straps wood blocks 20 are interposed to take up shock. After the blocks 20 are in position the straps, blocks and angle members are securely bolted together, as shown. The angles 18 and 19 are so disposed that the tangential portions extend in opposite directions from the straps or in the direction of rotation of the shaft 13 and have secured thereto by screws the two knives 21 and 22. These knives are beveled as shown at 23, and the angles 18 and 19 are beveled at 24. This latter bevel prevents gum collecting in the corner between the angle member and the knife. The central portion 10 of the housing is curved at 25 and 26 to correspond with the path of the tips of the knives 21 and 22. The lower end of the chute is provided with a slide valve 27 which controls the flow of fragments of chopped gum which slide down the chute by gravity and can be collected in any suitable receptacle placed beneath the end of the chute.

When the machine is in operation the billet of gum slides down the chute and the tips of the knives impact on the top of the billet and chop off a piece of the gum at each revolution. The action is similar to that of a hatchet.

The action of the knife upon the billet of gum is that of chopping rather than planing or cutting *per se*. An examination of the chips shows that they are actually torn away from the main body of the gum, like wood chips broken off with a hatchet. By this method of chopping the main mass of gum and the gum chips do not heat up and melt and clog the machine.

The size of the chips and the quantity produced in a given time is dependent upon the speed at which the knives are rotated and the weight of billets in the chute. The operator of the machine can adjust the speed so that the proper size chip is cut by varying the speed of the prime mover. The operator can also add extra billets to the upper part of the chute and thus force the lower billet downward with greater force against the knives and thus vary the size of the chip and quantity produced. The velocity of the air past the tips of the knives also serves to cool the knives.

The radial portions of the angles, the straps and the wood blocks act as fan blades when the chopping device is rotated. The above mentioned parts draw air through aperture 30 in the side walls of the central portion 10 of the housing. The contour of the central portion of the housing is such that the air blast thus produced is directed to and over the tips of the knives, thereby cooling them and also is directed up the chute 11 and down chute 12 under the slide valve 27. This blast of air in the chutes serves to cool both the billet of gum and the chips and prevent their melting and clogging the machine.

It is to be understood that my invention is not limited by the precise form and construction shown.

What I claim as my invention is pointed out in the appended claims:

1. In a device of the class described, in combination, a housing comprising a central ventilating chamber and chutes extending obliquely into and from the same, a central power driven shaft, tangential chopping blades rotatably mounted thereon and adapted to chip fragments from a mass of gum fed to the same, and means for maintaining an air blast over the knives and the gum in order to cool the same.

2. In a device of the class described, in combination, a housing comprising a central chamber and a chute extending upwardly therefrom, a central power driven shaft, a plurality of wide radial supporting arms rotatably mounted thereon, and chopping blades tangentially secured to the ends of said arms, these parts being constructed and arranged to chop off bits from a mass of gum descending the chute and to force an air blast over the knives and the descending gum in order to cool the same.

3. In a device of the class described, in combination, a housing comprising a central chamber and a plurality of chutes extending therefrom, a central shaft, a plurality of wide radial supporting arms rotatably mounted thereon, and chopping blades tangentially secured to the ends of the arms, said blades being adapted to chop off bits from a mass of gum fed into the device through an inclined chute, and the said arms and blades constituting a fan to force a blast of air over the blades to cool them and through the chutes to cool the gum therein.

4. In a device of the kind described, in combination, a housing comprising an arcuate central chamber and an inclined chute leading into the same, a central shaft, a pair of wide radial supporting arms or blades rotatably mounted thereon, chopping blades tangentially secured to the ends of said arms and adapted to chop off bits from a mass of gum placed in and sliding down the inclined chute, the said arms and blades constituting a fan or blower to force an air blast over the gum to keep it cool.

5. In a device of the class described, in combination, a housing having an arcuate central portion, a shaft journaled therein, a plurality of straps secured to said shaft, a plurality of angle members secured to the straps, cushion blocks interposed between the angle members and the straps to take up shocks, knives secured to the angle members, means for directing billets of gum to the knives to be chopped into chips upon the rotation of the shaft, angles and knives, and means for removing the chips from the arcuate portion of the housing.

In testimony whereof I affix my signature in the presence of two subscribing witnesses.

BENJAMIN W. BROWN.

Witnesses:
 GEORGE SCHNELL, Jr.,
 EDWARD KILSBY.

Copies of this patent may be obtained for five cents each, by addressing the "Commissioner of Patents, Washington, D. C."